Patented June 9, 1953

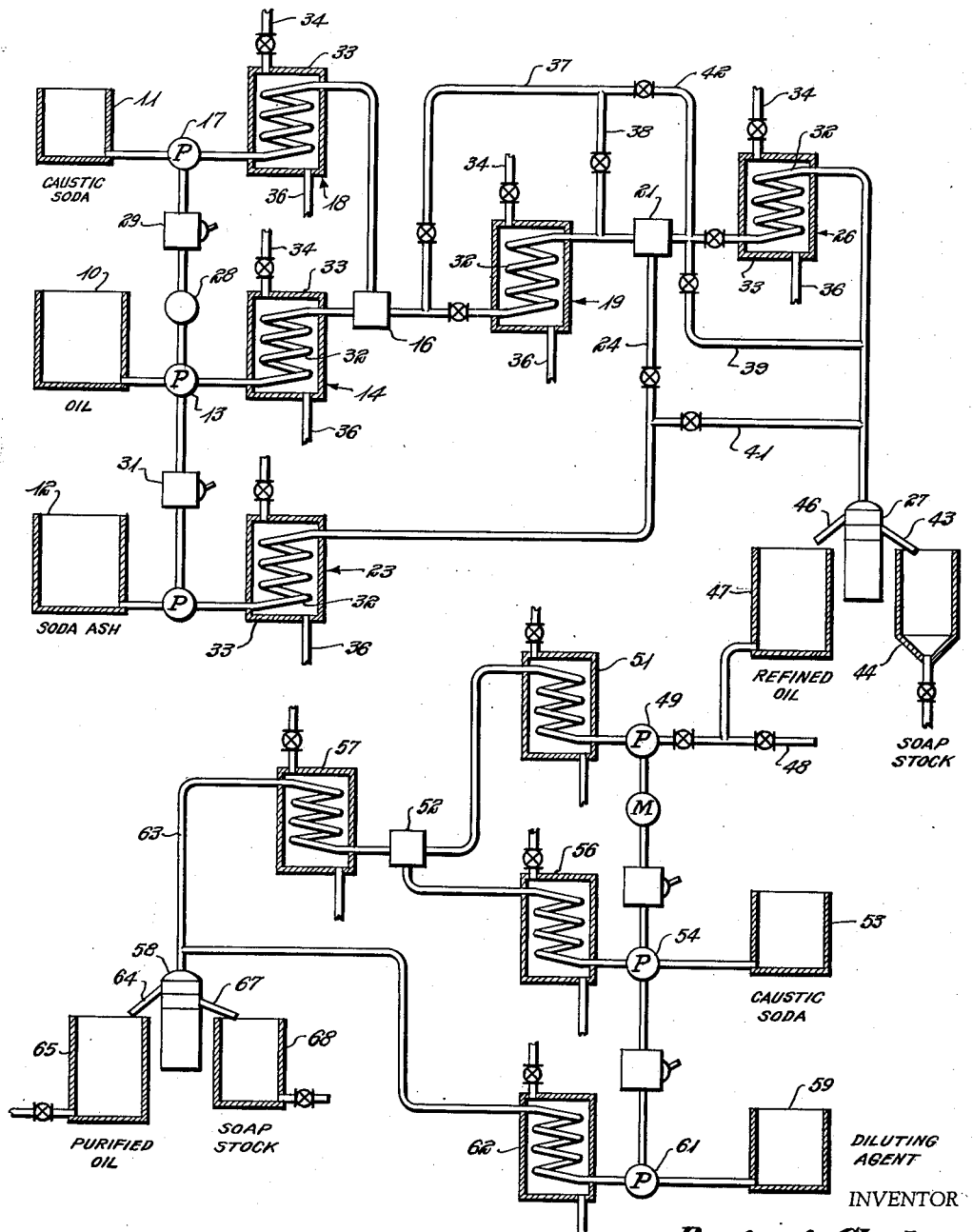

2,641,603

UNITED STATES PATENT OFFICE 2,641,603

REFINING OF GLYCERIDE OILS

Benjamin Clayton, Pasadena, Calif.

Application September 18, 1950, Serial No. 185,434

5 Claims. (Cl. 260—425)

This invention relates to the refining of glyceride oils, and more particularly, to a simplified continuous alkali refining process in which refining losses are minimized while at the same time a high quality oil is produced.

The original commercial continuous process of alkali refining glyceride oils, which process is still extensively employed, involves the continuous mixing of an aqueous solution of caustic soda having a concentration between approximately 10° and 20° Bé. with the oil in an amount sufficient to neutralize the acidity of the oil and also provide a substantial excess. The mixture is continuously centrifugally separated into oil and soapstock at an elevated temperature, usually between 120° and 160° F., the elevated temperature being produced by heating the materials in stream flow either before mixing or after mixing. While such process produces a high quality oil and materially reduces refining losses over the earlier developed batch process of alkali refining glyceride oils, a substantial loss of neutral oil results both from saponification of neutral oil by the excess caustic soda and from entrainment of a considerable amount of neutral oil in the soapstock separated from the oil.

An improved process known as the soda ash process is also in large scale commercial operation and involves the addition of an aqueous solution of soda ash to the oil in substantial excess. Such a mixture is not easily separable into neutral oil and soapstock, since carbon dioxide is evolved and interferes with separation of the soapstock from the oil. In order to overcome this difficulty, the mixture is introduced into a flash chamber while at an elevated temperature and subjected to a vacuum therein. The carbon dioxide and the major portion of the water are thereby removed from the mixture. The dehydrated mixture is thereafter rehydrated with additional soda ash solution and continuously separated in a centrifugal separator. With light colored oils, for example, corn oil or peanut oil, a satisfactory refined oil may be produced and the refining losses are very low. That is to say, the soda ash will not saponify the neutral oil so that refining losses due to saponification of neutral oil are entirely eliminated and the dehydration and rehydration steps condition the oil for very effective centrifugal separation such that losses of oil by entrainment of the oil in the soapstock are also substantially eliminated. For dark colored oils, such as cottonseed oil and in some cases even light colored oils, it is desirable to re-refine or caustic wash the oil employing a small amount of relatively concentrated caustic soda solution. Losses in the re-refining step are also very small and a high quality neutral oil is produced with a minimum of refining losses.

The present process departs from either of the prior processes above discussed by first employing a relatively concentrated aqueous solution of caustic soda in an amount which is not substantially greater than that required to neutralize the acidity of the oil and which will not saponify any appreciable amount of neutral oil. That is to say, the amount of caustic soda should not be used in substantial excess but in some cases may be somewhat less than that required to neutralize the acidity of the oil. In any case, the acidity of the oil mixture after the addition of caustic soda is not sufficient to cause the liberation of carbon dioxide upon addition of soda ash solution. The caustic soda solution preferentially combines with the fatty acids and other acidity of the oil before it attacks neutral oil. Since no substantial excess is employed and the strong caustic solutions attack neutral oil to a lesser extent than more dilute caustic solutions, substantially no saponification of the neutral oil takes place during the caustic soda treatment. Since the caustic soda solution is quite concentrated, the resulting mixture is low in water content and may be considered to be a partially dehydrated mixture. Such a mixture cannot be efficiently separated in a continuous centrifugal separator as the foots or soapstock are thick and viscous and will entrain a substantial amount of neutral oil. Also the soap does not separate cleanly from the oil. However, it has been found that by adding a substantial amount of soda ash solution to such a mixture before introduction into the centrifugal separator or during separation in the centrifugal separator, a relatively liquid soapstock in which very little neutral oil is entrained can be readily separated from the neutral oil. As in the soda ash process discussed above, a high quality refined oil may be produced from light colored oils with minimum refining losses. However, for dark colored oils a re-refining step involving the addition of a relatively concentrated caustic soda solution followed by continuous centrifugal separation is desirable in order to reduce the color of the oil. Also in many cases the re-refining step may be advantageously employed even for light colored oils to remove residual impurities. As in the commercial soda ash process the losses in the re-refining step are also very low. The improved process of the present invention therefore produces a high quality oil with a minimum of refining losses while at the same time eliminating the dehydration step of the commercial soda ash process along with the extensive apparatus and heat losses associated therewith.

It is therefore an object of the present invention to provide an improved process for alkali refining glyceride oils in which refining losses are minimized.

Another object of the invention is to provide a process of alkali refining glyceride oils in which caustic soda is employed as the neutralizing agent but losses due to saponification of neutral oil and entrainment of neutral oil in the soapstock separated from the oil are largely eliminated.

A further object of the invention is to provide an improved process of alkali refining of glyceride oils in which a relatively concentrated caustic soda solution is employed as a neutralizing agent in an amount not substantially in excess of that required to neutralize the acidity of the oil and a soda ash solution is thereafter employed to render the resulting mixture separable.

Other objects and advantages of the invention will appear in the following detailed description thereof in which reference is made to suitable apparatus for carrying out the process, which apparatus is shown in the attached drawing.

Referring to the drawing, the glyceride oil to be refined may be supplied from the tank 10. Caustic soda solution for neutralizing the oil may be supplied from the tank 11 and soda ash solution may be supplied from the tank 12. The oil may be pumped from the tank 10 by means of a pump 13 and delivered through a heater 14 to the mixer 16. In a similar manner the caustic soda solution may be pumped from the tank 11 by means of the pump 17 and passed through the heater 18 to the mixer 16. The oil and caustic soda solution are thoroughly and rapidly mixed in the mixer 16, which mixer may be of any known or suitable type and the resulting mixture under pressure from the pumps 13 and 17 may be delivered through another heater 19 to a second mixer 21. Soda ash solution may be pumped from the tank 12 by means of the pump 22 and delivered through the heater 23 into the mixer 21 by means of a conduit 24. The mixer 21 may be similar to the mixer 16 and the resulting mixture may be passed through another heater 26 and delivered into a continuous centrifugal separator 27.

The pumps 13, 17 and 22 may be proportioning pumps forming part of a proportioning apparatus. That is to say, the three pumps may be driven by a variable speed motor 28 and speed change devices 29 and 31 may be interposed between the motor 28 and the pumps 17 and 22, respectively, although any other suitable type of proportioning apparatus may be employed. The various heaters 14, 18, 19, 23 and 26 are shown as including coils 32 through which the material to be heated is passed, the coils being positioned in the casings 33 through which any desired heating medium, such as steam, may be passed by means of the pipe connections 34 and 36. Any other suitable type of heating apparatus may, however, be employed. Although the devices including the coils 32 and casings 33 have been referred to as heaters it will be apparent that they are in fact heat exchange devices and can be employed for cooling the material being passed therethrough, if desired, by passing a cooling medium through the casings 33 by means of the pipe connections 34 and 36. Thus the various materials may be brought to the desired temperatures in the heat exchangers and if no temperature change is required in a particular case, the heat exchanger may be by-passed or in the case of a mixture, a heat exchanger may be employed to provide greater time of contact between the constituents of the mixture with or without changing the temperature of the mixture.

If in treating a particular oil, it is found desirable to minimize the time of contact between the oil and the caustic soda solution, the heaters 14 and 18 may be employed to bring the oil and caustic soda solution to a desired temperature and the heater 19 may be by-passed by means of the conduits 37 and 38. Similarly, if it is desired to minimize the time of contact after the soda ash solution has been added, the heater 26 may be by-passed by means of the conduit 39. In fact, in some instances it is desirable to add the soda ash solution just before the mixture of oil and caustic soda enters the centrifugal separator 27, in which case the mixer 21 and heater 26 may be by-passed by the soda ash solution by employing the conduit 41. In the latter case, the mixture of oil and caustic soda may be passed through the heater 19 and mixer 21 or the heater 19 may be by-passed. In fact, the mixer 21 may likewise be by-passed by employing the conduit 42. That is to say, the mixture of caustic soda and oil can be either sent directly to the centrifugal separator through the conduits 37, 42 and 39 or may be sent through any desired combination of the heaters 19 and 26 and the mixer 21. In some cases, it may be desirable to add the soda ash solution as a flush within the centrifugal separator itself in which case a centrifugal separator of the type disclosed in Clayton Patent No. 2,412,251 may be employed.

In the centrifugal separator 27 a separation is made between the neutral oil and soapstock, the soapstock being discharged as the heavier effluent through the spout 43 into a tank 44. The neutral oil is discharged as the lighter effluent through the spout 46 into a tank 47. Where light colored oils, such as corn oil or peanut oil are being refined, the oil delivered into the tank 47 may constitute the final product and may be discharged from the process through the conduit 48 although it is many times desirable to remove residual impurities from even light colored oils by the re-refining step referred to above. For dark colored oils, for example cottonseed oil, it is usually desirable to subject the refined oil to such a re-refining treatment involving the addition to the oil of a small amount of caustic soda solution. In such cases the oil from the tank 47 may be pumped from such tank by means of the pump 49, passed through a heater 51 and delivered to a mixer 52. Caustic soda solution from a tank 53 may be delivered by the pump 54 through the heater 56 to the mixer 52. The mixer 52 may be any known or suitable type and may be similar to the mixers 16 and 21. The resulting mixture may then be passed through another heater 57 and delivered into a centrifugal separator 58.

It is usually desirable to add a diluting agent to the mixture just prior to centrifugal separation and this may be accomplished by withdrawing a diluting agent, such as water, from the tank 59 by means of a pump 61, passing the same through a heater 62 and introducing the same into the conduit 63 which supplies the mixture of oil and caustic soda solution to the centrifugal separator 58. The heaters 51, 56, 57 and 62 may be of any suitable type and may be similar to the heaters 14, 18, etc. Again, the centrifugal separator 58 may be of the type shown in Clayton Patent No. 2,412,251 in which case the diluting agent may be delivered directly into the centrifugal separator as a flush. In the centrifugal separator 58 the purified oil is separated from the soapstock and discharged as a lighter effluent through the spout 64 into a tank 65 from which it may be withdrawn from the process and a small amount of soapstock containing the diluting agent, if employed, is discharged as a heavier effluent through a spout 67 into a tank 68.

In carrying out the process a relatively strong caustic soda solution is initially admixed with the oil, i. e., the caustic soda solution delivered to the mixer 16 from the tank 11 will have a concentration between approximately 25 and 50° Bé., concentrations in the range of from 25 to 40° Bé. being preferred. Sufficient caustic soda solution is preferably employed to neutralize the acidity of the oil. That is to say, no substantial excess of caustic soda solution is used. The amount of caustic soda solution required to neutralize the acidity of the oil may be determined according to the American Oil Chemists Society Official Methods. The oil and caustic soda are preferably contacted with each other at a relatively low temperature, for example, a temperature between 70° and 110° F., the lower temperatures in this range being preferred. That is to say, the heaters 14 and 18 may be employed to either raise or lower the temperature of the oil and caustic soda solution to bring their temperature within the desired range. If no adjustment of temperature of the oil or caustic soda solution is required, prior to mixing, the heaters 14 and 18 may be by-passed by conduits (not shown). In general, it is not usually desirable to increase the temperature of the mixture of caustic soda and oil much above 110° F., prior to the addition of the soda ash solution.

The temperature of separation after addition of the soda ash solution will usually range, however, between 100° and 160° F., and may be as high as 200° F., and the heater 19 may be employed to raise the temperature of the caustic soda and oil mixture up to not more than 110° F. and the heater 26 may be employed to raise the temperature of the resulting mixture of soda ash, caustic soda and oil to the desired separation temperature.

It will be appreciated that the exact mixing and heating sequence employed may be varied and it is desirable to provide for such variations since the various glyceride oils vary considerably in properties and it has been found that certain oils respond better to heating before admixture with either soda ash or caustic soda solution or both while others respond better to heating after mixing. Also, some oils require a longer time of contact with the caustic soda before mixing with the soda ash solution than other oils and the heater 19 may be employed to give such longer time of contact even though no temperature increase or decrease of the mixture is accomplished therein. Also, some oils respond better to having the soda ash solution intensely mixed therewith, for example in the mixer 21, or require a longer time of contact between the soda ash solution and the previously made caustic soda and oil mixture, in which case the heater 26 may be employed for such purpose.

In general, the caustic soda should be first thoroughly admixed with the oil at a temperature between approximately 70° and 110° F., the temperature of this mixture should not be increased materially above 110° F., and a soda ash solution should thereafter be admixed with the oil and separation should take place at a temperature between approximately 100° and 160° F. In many cases, a relatively high temperature of separation may be obtained by delivering the mixture of oil and caustic soda to the centrifuge at a relatively low temperature and supplying to the centrifuge a relatively hot flush of soda ash solution.

The soda ash solution will usually have a concentration between 10° and 20° Bé. and will be employed in an amount ranging between approximately 1 and 5% of the solution by weight based on the amount of oil. In general, the amount and concentration of the soda ash solution should be such as to increase the moisture content of the soapstock discharged from the centrifugal separator 27 up to 25 to 50% by weight of the soapstock.

As stated above, light colored oils delivered into the tank 47 from the centrifugal separator 27 may be discharged from the process as refined oil but dark colored oils, in general, do not have their color sufficiently removed in the process just described. Furthermore, even light colored oils are usually benefited by re-refining with caustic soda in accordance with the disclosure of Clayton Patent No. 2,412,251. Thus in accordance with the disclosure of such patent, the oil from the tank 47 may be admixed with a caustic soda solution in the mixer 52 and sent to the centrifugal separator 58. A diluting agent, for example water, or a dilute solution of soda ash may be injected into the mixture of oil and caustic soda solution just prior to introduction of said mixture into the centrifugal separator 58, or even within the centrifugal separator itself as disclosed in such patent.

The concentration of the caustic soda solution from the tank 53 will, in general, range between about 20° and 50° Bé. and the amount of such solution will usually range between approximately 0.5% and 4%, the quantity most generally used being in the neighborhood of 2% based on the weight of the oil. The temperature of mixing is preferably between 70° and 100° F. although for removing certain types of impurities, this temperature may be as high as 130 to 140° F., the heaters 51 and 56 being employed for adjusting the temperature of the materials being mixed in the mixer 52. The temperature of separation will usually range between 120 and 180° F., and preferably between 120 and 160° F., although with some oils this temperature may be as low as 100° F. Water is the preferred diluting agent and the amount of water will ordinarily range between approximately 2.5 and 10 times the weight of caustic soda solution employed. In general, it has been found desirable to reduce the concentration of the excess caustic soda solution in the centrifugal separator to at least 8° Bé. although in some instances higher concentrations up to 10° or 12° Bé. have been found operable and in other cases, concentrations as low as 4° Bé. have been found advantageous. The heavier effluent discharged through the spout 67 contains a small amount of soap, and in any event, the amount of water or other diluting agent employed in the centrifugal separator should be sufficient to cause the soap to cleanly separate from the oil in solution or dispersion in the aqueous phase. The temperature of the diluting agent should, in general, be at least as high as the temperature of the oil and caustic soda mixture entering the centrifugal separator and may be somewhat higher.

It is usually desirable to subject the oil discharged from the re-refining step, or if no re-refining step is employed, the oil from the initial refining step, to a water washing treatment involving mixing of water with the oil in an amount between approximately 5 to 20% of the oil by weight and centrifugally separating the water from the oil.

The present process is thus an improvement over the commercial caustic soda processes in that it materially reduces the refining losses including losses due to saponification of neutral oil and entrainment of neutral oil in the soapstock and is an improvement over the soda ash process in that it eliminates the dehydration step employed therein while at the same time resulting in refining losses as low or lower than the soda ash process.

The process of the present invention is applicable to substantially all types of glyceride oils including animal, vegetable and marine oils as it is sufficiently flexible to produce a high quality oil with low losses when employed to refine nearly any type of glyceride oils likely to be encountered. The process produces particularly good results with low free fatty acid oils or oils containing a low ratio of free fatty acids to gums but may be employed to produce excellent results even with high free fatty acid oils or previously degummed oils. The present process avoids the employment of the large amounts of soda ash found necessary when refining high free fatty acid oils and also avoids the evaporation of large amounts of water in a dehydration step.

I claim:

1. The process of alkali refining a glyceride oil, which comprises, mixing a concentrated aqueous solution of caustic soda with said oil, said solution of caustic soda having a concentration between approximately 25° and 50° Bé. and being added in an amount sufficient to neutralize the acidity of said oil without providing any substantial excess of said caustic soda, thereafter admixing an aqueous solution of soda ash with said oil and continuously centrifugally separating the resulting aqueous soapstock from said oil, the amount and concentration of said soda ash solution being sufficient to cause said soapstock to separate cleanly from said oil.

2. The process of alkali refining glyceride oils, which comprises, admixing with said oil a caustic soda solution having a concentration between approximately 25 and 50° Bé. in sufficient amount to substantially completely neutralize the acidity of said oil without providing any substantial excess of caustic soda to produce a neutralized mixture having a relatively low water content, thereafter admixing with said mixture a soda ash solution having a concentration between approximately 10° and 20° Bé. in an amount between approximately 1% and 5% of solution based on the oil and continuously centrifugally separating soapstock from said oil.

3. The process of alkali refining a glyceride oil, which comprises, continuously mixing a stream of said oil and a stream of caustic soda solution having a concentration between approximately 20° and 50° Bé., the amount of said solution being sufficient to neutralize the acidity of said oil without providing a substantial excess of caustic soda, thereafter admixing a solution of soda ash with said oil and continuously centrifugally separating soapstock from said oil, said soda ash solution having a concentration between approximately 10° and 20° Bé. and being sufficient in amount to produce a soapstock having between approximately 25 and 50% water content by weight.

4. The process of alkali refining a glyceride oil, which comprises, mixing a concentrated aqueous solution of caustic soda with said oil, said solution of caustic soda having a concentration between approximately 25° and 50° Bé. and being added in an amount sufficient to neutralize the acidity of said oil without providing any substantial excess of said caustic soda, maintaining the temperature of said oil and solution of caustic soda at a temperature not higher than approximately 110° F., thereafter admixing an aqueous solution of soda ash with said oil and continuously centrifugally separating the resulting aqueous soapstock from said oil at a temperature between approximately 100° and 160° F., said solution of soda ash having a concentration between approximately 10° and 20° Bé. and being added in an amount sufficient to cause said soapstock to separate cleanly from said oil.

5. The process of alkali refining a glyceride oil, which comprises, mixing a concentrated aqueous solution of caustic soda with said oil, said solution of caustic soda having a concentration between approximately 25° and 50° Bé. and being added in an amount sufficient to neutralize the acidity of said oil without providing any substantial excess of said caustic soda, maintaining the temperature of said oil and solution of caustic soda at a temperature not higher than approximately 110° F., thereafter admixing an aqueous solution of soda ash with said oil and continuously centrifugally separating the resulting aqueous soapstock from said oil at a temperature between approximately 100° and 160° F., said solution of soda ash having a concentration between approximately 10° and 20° Bé. and being added in an amount sufficient to cause said soapstock to separate cleanly from said oil, and thereafter mixing said oil with a solution of caustic soda having a concentration between approximately 20° and 50° Bé. and in an amount between approximately 0.5% and 4% of the weight of said oil, and continuously centrifugally separating an additional amount of soapstock from said oil at a temperature between approximately 120° and 180° F.

BENJAMIN CLAYTON.

References Cited in the file of this patent

UNITED STATES PATENTS

| Number | Name | Date |
|---|---|---|
| Re. 21,992 | Clayton | Jan. 6, 1942 |
| 2,219,088 | Clayton | Oct. 22, 1940 |
| 2,226,211 | Thurman | Dec. 24, 1940 |
| 2,249,702 | Clayton | July 15, 1941 |